(12) United States Patent
Guthke et al.

(10) Patent No.: US 8,590,847 B2
(45) Date of Patent: Nov. 26, 2013

(54) CABLE MANAGEMENT DEVICE FOR BUNDLES OF CABLES IN AN AIRCRAFT

(75) Inventors: Hans-Peter Guthke, Buxtehude (DE); Lueder Kosiankowski, Harsefeld (DE); Nico Papke, Vietluebbe (DE); Philipp Rathgeber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 110 days.

(21) Appl. No.: 13/117,158

(22) Filed: May 27, 2011

(65) Prior Publication Data

US 2011/0290951 A1    Dec. 1, 2011

Related U.S. Application Data

(60) Provisional application No. 61/349,350, filed on May 28, 2010.

(30) Foreign Application Priority Data

May 28, 2010   (DE) .......................... 10 2010 021 835

(51) Int. Cl.
   *F16L 3/22*      (2006.01)
   *H02G 3/04*     (2006.01)

(52) U.S. Cl.
   USPC .................... 248/68.1; 248/74.1; 174/68.1

(58) Field of Classification Search
   USPC .............. 248/55, 58, 68.1, 74.1, 74.2, 74.3, 248/230.1, 634; 174/72 A, 72, 68.1, 72 R, 174/651, 120 AR, 110 AR; 24/16 R, 594.1, 24/530
   See application file for complete search history.

(56) References Cited

U.S. PATENT DOCUMENTS

| | | | | |
|---|---|---|---|---|
| 2,813,692 A * | 11/1957 | Peterson et al. | | 248/56 |
| 2,902,821 A * | 9/1959 | Kelly, Jr. | | 24/594.1 |
| 4,715,571 A * | 12/1987 | Soltow et al. | | 248/68.1 |
| 5,406,032 A * | 4/1995 | Clayton et al. | | 174/151 |
| 5,742,982 A * | 4/1998 | Dodd et al. | | 24/16 R |
| 6,622,585 B1 * | 9/2003 | Salomonsson et al. | | 248/68.1 |
| 6,710,249 B1 * | 3/2004 | Denton | | 174/651 |
| 7,500,644 B2 | 3/2009 | Naudet et al. | | |
| 7,750,644 B2 | 7/2010 | Pipitone et al. | | |
| 8,020,811 B2 * | 9/2011 | Nelson | | 248/68.1 |
| 8,291,551 B2 * | 10/2012 | Bruss et al. | | 174/72 A |
| 2003/0173470 A1 * | 9/2003 | Geiger | | 248/55 |
| 2011/0290951 A1 * | 12/2011 | Guthke et al. | | 248/68.1 |

FOREIGN PATENT DOCUMENTS

| | | |
|---|---|---|
| DE | 19923464 A1 | 12/2000 |
| DE | 102006054473 A1 | 6/2008 |
| EP | 0924830 A1 | 6/1999 |

* cited by examiner

*Primary Examiner* — Tan Le
(74) *Attorney, Agent, or Firm* — Leydig, Voit & Mayer, Ltd.

(57) ABSTRACT

A cable management device accommodates bundles of cables in an aircraft. The cable management device includes a star shaped cable management element and a retaining clamp. The star-shaped cable management element includes a plurality of outer-radial recesses disposed in an outer radius of the star-shaped cable management element that are spaced apart from each other. Each outer-radial recess is configured to accommodate a cable inserted therein. The retaining clamp is disposed around an outer circumference of the star-shaped cable management element so as to encompass the star-shaped cable management element and close the outer radial recesses. The retaining clamp includes an attachment portion configured to affix the cable management element to a stationary supporting structure.

11 Claims, 1 Drawing Sheet

CABLE MANAGEMENT DEVICE FOR BUNDLES OF CABLES IN AN AIRCRAFT

CROSS REFERENCE TO RELATED APPLICATIONS

This application claims priority to U.S. Provisional Patent Application No. 61/349,350, filed May 28, 2010 and German Patent Application No. 10 2010 021 835.9-55 filed, May 28, 2010, which are both hereby incorporated by reference herein in their entirety.

FIELD

The invention relates to a cable management device for bundles of cables in an aircraft.

BACKGROUND

Within the fuselage of commercial aircraft for the transport of passengers or cargo, which fuselage as a rule is a large-volume fuselage, there are pipes for fluids and the electrical cable harnesses. The term "cable harnesses" refers to bundled single-conductor or multi-conductor electrical cables with insulating sheathing, with at least two cables being involved. Such harnesses comprise electrical voltage supply lines or electronic control lines that can form part of, for example, electrical bus systems for aircraft-internal communication between electrical devices and the like. In particular, the present invention can be used for coaxial cables which are mostly used for transmitting high-frequency signals. When viewed from the cabin interior, the harnesses are mostly laid, so that they are invisible, between the aircraft skin and the cabin interior in the region of the aircraft structure which usually comprises frame elements and stringers. For laying the cable harnesses special cable management devices are used, which not only hold together the cable harness that comprises individual cables but also connect it to the aircraft structure or to some other suitable stationary supporting structure.

BACKGROUND

Generic management devices typically comprise a plastic clamp that towards one side is screwed to a stationary supporting structure and encloses a multiple bundle of cables in a clamp-like manner. To prevent the cables from becoming mechanically damaged during clamping, a self-vulcanising tape is usually wrapped around said cables, which tape provides a type of protective layer between the cables and the clamp that surrounds said cables. The clamp is usually closed with the use of a cable tie which is tightened by means of a cable tie gun.

During wrapping of the tape around the multiple bundle and during closing of the clamp by means of a cable tie gun, considerable pressure is exerted on the sheathing of the cables. In particular, coaxial cables are extremely sensitive to such external pressure influence which can have a negative effect on signal transit times. Therefore, when a multiple bundle of cables sustains damage, usually the entire routes need to be completely exchanged, which involves a considerable amount of work.

U.S. Pat. No. 7,750,644 B2 shows another cable management device that makes do without a tape being wrapped around the attachment positions. In this arrangement a star-shaped cable management element is used that comprises outer-radial recesses, each accommodating a cable. However, the sheathed cables are not directly clipped into the recesses, instead an intermediate ring is necessary that has previously been slid onto each cable. Apart from electrical cables it is also possible to install bundled fluid lines by means of the star-shaped cable management element. Attachment to a stationary supporting structure of the cables and lines that have been bundled in this manner does not take place by way of the star-shaped cable management element itself, but by way of separate retaining brackets that position a particularly stable line at a distance from the supporting structure. The star-shaped cable management elements are affixed to this line in order to, following this line, also install other cables. For the purpose of clamping the star-shaped cable management element to the stable line, on the inner radius said cable management element is arranged as a clamp which can be closed and opened by way of a transverse screw fastener.

While the known star-shaped cable management element ensures gentle bundling of individual cables, the installation relative to a stationary supporting structure appears, however, to be quite elaborate. Moreover, the star-shaped cable management element is provided only for special applications, namely in the field of an aircraft engine.

SUMMARY

An aspect of the present invention is to provide a cable management device for bundles of cables in an aircraft, which cable management device is provided for easy installation of cables and is suitable in particular for electrical cables that are sensitive to pressure and to bending.

In an embodiment, the present invention provides a cable management device for bundles of cables in an aircraft. The cable management device includes a star shaped cable management element and a retaining clamp. The star-shaped cable management element includes a plurality of outer-radial recesses disposed in an outer radius of the star-shaped cable management element that are spaced apart from each other. Each outer-radial recess is configured to accommodate a cable inserted therein. The retaining clamp is disposed around an outer circumference of the star-shaped cable management element so as to encompass the star-shaped cable management element and close the outer radial recesses. The retaining clamp includes an attachment portion configured to affix the cable management element to a stationary supporting structure.

BRIEF DESCRIPTION OF THE DRAWINGS

Exemplary embodiments of the present invention will be described in further detail below with reference to the drawings, in which.

DETAILED DESCRIPTION

Figure 1:
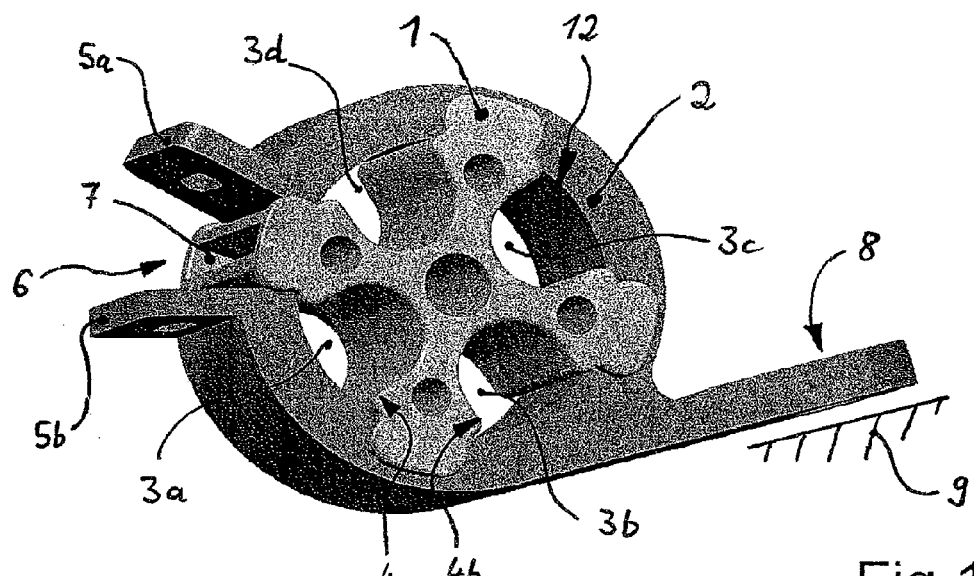
FIG. 1 shows a perspective view of a cable management device with a star-shaped cable management element arranged in a retaining clamp.

The present invention relates to a cable management device comprising a star-shaped cable management element with several outer-radial recesses, arranged so as to be spaced apart from each other, for accommodating a cable each, wherein the cable management element can be affixed to a stationary supporting structure of the aircraft by way of attachment means.

An aspect of the invention is to provide the technical teaching according to which a star-shaped cable management element on its outer circumference is encompassed by a retaining clamp for closing the recesses in the outer radius, each recess being provided to insert a cable, which retaining clamp also comprises an attachment portion to affix the cable management element to the stationary supporting structure.

The solution according to embodiments of the invention provides an advantage in particular in that the cables can be installed by being placed in the recesses of the cable management element without being squashed. Typically, a small clearance fit still remains between the inserted cable and the recess. To prevent the cables installed in such a manner in the recesses of the star-shaped cable management element from automatically becoming detached, the star-shaped cable management element is encompassed by the retaining clamp so that said retaining clamp closes the outer-radial recesses that are open towards the outside.

In terms of functional integration, apart from the above, the retaining clamp is also directly used for attaching the cable, which has been bundled by means of the star-shaped cable management element, to the stationary supporting structure. In this arrangement a conventional standard attachment clamp can be used as a retaining clamp, which standard attachment clamp is closed in a simple manner by means of cable ties and a cable tie gun. Damage to the bundled cables as a result of the pressure generated by the cable tie gun can be completely excluded as a result of the star-shaped cable management element situated on the inside. Installation within the aircraft no longer necessitates time-consuming rework. In particular, there is no longer any need to wrap self-vulcanising tape around the bundled cables in order to fill the standard attachment clamp.

Preferably, the retaining clamp is designed as a type of radially-slit ring and comprises facing closure eyelets at the ends that extend radially outwards, which closure eyelets can be interconnected with attachment means in order to close the retaining clamp. To this effect primarily the already mentioned cable ties are suitable. However, it is also imaginable to use other attachment means, for example screws or a clip connection, provided they reliably keep the retaining clamp closed.

According to a preferred embodiment, it is provided for a securing pin to be formed to the cable management element, which securing pin extends outwards into the slit region of the slit retaining clamp. In the installed position the securing pin serves as an anti-rotation device for the cable management element.

Apart from the above it is proposed that the retaining clamp preferably also be equipped with an anti-slide device for the inserted cable. To this effect on the interior wall side of the retaining clamp a rubber layer is installed which in the assembled state establishes contact with the cable, thus preventing axial sliding relative to the cable management device.

For attachment of the retaining clamp to the supporting structure the latter preferably comprises an attachment portion that extends outwards tangentially to radially, which attachment portion is formed as an end eyelet for accommodating attachment means, for example screws. Consequently there is no need to provide separate attachment means for attaching the bundled cables to the supporting structure.

Furthermore it is proposed that the outer-radial recesses of the star-shaped cable management element preferably be shaped as a U-shaped profile. The associated cable can then be simply placed into the aforesaid. In order to provide additional protection against inserted cables falling from the recess during installation, it is proposed that in the region of the distal end of the two leg sections of the U-shaped recess slight material mouldings that are directed radially inwards be provided for clipping the cable in. After the cable has overcome the clipping-in resistance provided by the mouldings, said cable reaches its desired position free of any pressure. Preferably, each outer-radial recess accommodates the associated cable in the installed state in such a non-clamping manner.

According to another embodiment of the invention it is proposed for the region of the outer circumference of the cable management element to comprise at least one pair of opposite protruding portions, which are formed on the outer circumference of the cable management element. In this arrangement these formed protruding portions interact in a positive-locking manner with the flanks of the retaining clamp, in this manner providing an anti-loss device for the cable management element inserted in the retaining clamp. As a result of this positive-locking fit that is easy to bring about, the cable management element is additionally secured within the retaining clip against falling out.

The cable management element can be designed so as to be symmetrical in order to form a uniform cable bundle, and in applications of interest in the context of this document preferably comprises three to eight outer-radial recesses that are equidistantly spaced apart from each other. Particularly preferably, the star-shaped cable management element comprises four such recesses and to this effect comprises a cruciform profile.

It is proposed that at least the cable management element and the retaining clamp be produced in a simple manner from a plastic by means of injection moulding. In this context it should be ensured that plastics of adequate fatigue strength are used, in particular for the retaining clamp.

According to FIG. 1 the cable management device comprises a star-shaped cable management element 1 and a retaining clamp 2 encompassing said cable management element 1.

The star-shaped cable management element 1 comprises a total of four outer-radial recesses 3*a*-3*d*, each accommodating a cable (not shown in further detail). The outer-radial recesses 3*a*-3*d* of the star-shaped cable management element 1 comprise a U-shaped profile. Towards the distal end of the two leg sections of the U-shaped recess 3*a*-3*d*, in each case a pair of radially-inwards directed mouldings 4*a* and 4*b* for clipping-in the cable are provided.

The retaining clamp 2, which is designed as a radially-slit ring, comprises two closure eyelets 5*a* and 5*b* that face each other and extend radially outwards, which closure eyelets 5*a* and 5*b* can, for example, be closed with the use of a cable tie. To ensure non-rotation of the star-shaped cable management element 1 relative to the retaining clamp 2, said cable management element 1 comprises a securing pin 7 moulded towards the outside in the slit region 6 of the retaining clamp 2.

Furthermore, on the retaining clamp 2 an attachment portion 8 that extends tangentially outwards is moulded. The attachment portion 8 is used to affix the retaining clamp 2 to a supporting structure 9 (only diagrammatically indicated in the drawing). On the inside of the wall the retaining clamp 2 is coated with a rubber coating 12 to provide an anti-slide device for inserted cables.

Figure 2:
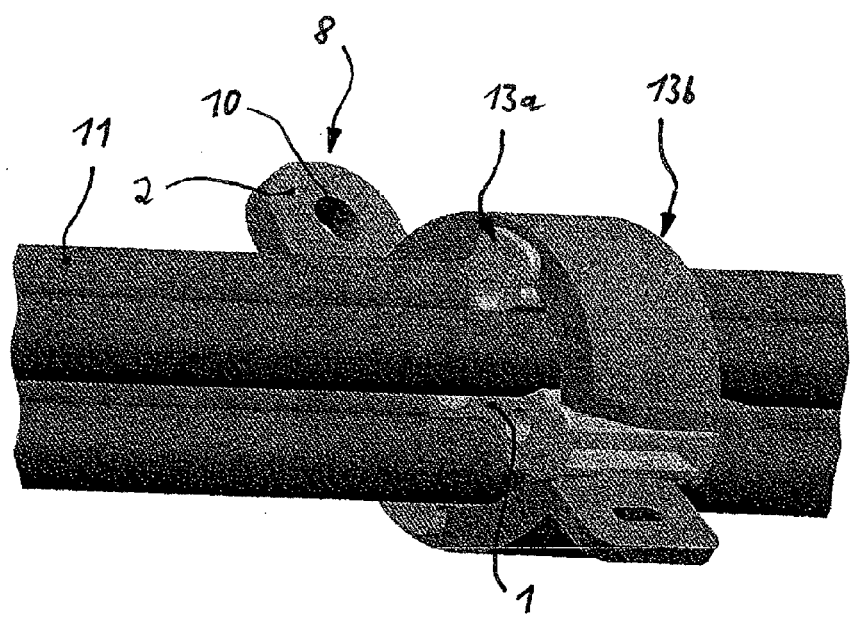
FIG. 2 shows a perspective view of cables, laid in bundles, with the use of the cable management device according to FIG. 1.

As shown in FIG. 2, the attachment portion 8 of the retaining clamp 2 comprises an eyelet 10 to accommodate attachment means (not shown in detail). Thus in this way a screw connection can be established with the supporting structure. The four cables 11 inserted in the star-shaped cable management element 1 are completely encompassed by the retaining clamp 2 in order to ensure reliable retention of the cable harness formed thereby.

The star-shaped cable management element 1 furthermore comprises several pairs of protruding portions 13a and 13b moulded so as to face each other. The protruding portions 13a and 13b interact in a positive-locking manner with the flanks of the retaining clamp 2 and form an anti-loss device for the cable management element 1 situated on the inside.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above.

While the invention has been particularly shown and described with reference to preferred embodiments thereof, it will be understood by those skilled in the art that various changes in form and details may be made therein without departing from the spirit and scope of the invention.

LIST OF REFERENCE CHARACTERS

1 Cable management element
2 Retaining clamp
3 Recess
4 Moulding
5 Closure eyelet
6 Slit region
7 Securing pin
8 Attachment portion
9 Supporting structure
10 Eyelet
11 Cable
12 Rubber coating
13 Protruding portions

What is claimed is:

1. A cable management device for bundles of cables in an aircraft, the cable management device comprising:
   a star-shaped cable management element including a plurality of outer-radial recesses disposed in an outer radius of the star-shaped cable management element and spaced apart from each other, each outer-radial recess being configured to accommodate a cable inserted therein; and
   a retaining clamp including:
      a ring disposed around an outer circumference of the star-shaped cable management element so as to encompass the star-shaped cable management element and close the outer radial recesses, and
      an attachment portion extending outward from the ring, the attachment portion being configured to affix the cable management element to a stationary supporting structure,
   wherein an inside wall of the retaining clamp is coated with a rubber coating that is configured to establish contact with an inserted cable so as to provide an anti-slide device for the inserted cable.

2. The cable management device recited in claim 1, wherein the ring of the retaining clamp includes a slit forming ends, each of which has a facing closure eyelet that extends radially outward, the facing closure eyelets being configured to be interconnected with an attachment device.

3. The cable management device recited in claim 1, wherein the cable management element includes a securing pin extending outwards into a slit region of the retaining clamp.

4. The cable management device recited in claim 1, wherein the attachment portion of the retaining clamp extends outwards tangentially to radially the attachment portion includes an end eyelet configured to accommodate an attachment member.

5. The cable management device recited in claim 1, wherein each outer-radial recess of the star-shaped cable management element includes a U-shaped profile.

6. The cable management device recited in claim 5, wherein two leg sections are formed around each U-shaped recess, and a molding is disposed at a distal end of each leg section, each molding being directed radially inwards and configured to clip a cable in the respective U-shaped recess.

7. The cable management device recited in claim 1, wherein each outer-radial recess is configured to accommodate a respective cable in a non-clamping manner.

8. The cable management device recited in claim 1, wherein the cable management element includes at least one pair of opposite protruding portions, each opposite protruding portion being disposed at an outer circumference of the cable management element on a respective face of the cable management element, the at least one pair of opposite protruding portions interacting with flanks of the retaining clamp in a positive-locking manner.

9. The cable management device recited in claim 1, wherein the cable management element is symmetrical and includes three to eight outer radial recesses that are equidistantly spaced apart.

10. The cable management device recited in claim 1, wherein each of the cable management element and the retaining clamp is a plastic injection molded part.

11. The cable management device recited in claim 1, wherein the outer-radial recesses are configured to accommodate coaxial cables.

* * * * *